United States Patent [19]

Pehlgrim

[11] Patent Number: 4,627,286
[45] Date of Patent: Dec. 9, 1986

[54] PRESSURE OR PRESSURE DIFFERENCE MEASURING INSTRUMENT

[75] Inventor: Horst Pehlgrim, Berlin, Fed. Rep. of Germany

[73] Assignee: Siemens Aktiengesellschaft, Munich, Fed. Rep. of Germany

[21] Appl. No.: 707,229

[22] Filed: Mar. 1, 1985

[30] Foreign Application Priority Data

Mar. 9, 1984 [DE] Fed. Rep. of Germany ... 8407656[U]

[51] Int. Cl.$^4$ ............................................. G01L 19/14
[52] U.S. Cl. ......................................... 73/431; 73/753
[58] Field of Search ............ 73/431, 432 A, 432 AD, 73/756, 753, 754, DIG. 4, 717, 718, 719, 720, 721, 722, 723, 724, 725, 726, 727, 728, 705, 733, 734, 735

[56] References Cited

U.S. PATENT DOCUMENTS 4,023,000 5/1977 Ankeny et al. ...................... 73/725
4,085,620 4/1978 Tanaka ................................. 73/727
4,250,759 2/1981 Vago et al. ........................... 73/754

OTHER PUBLICATIONS

Fuji Electric Publication EJPW 52-6-1, "Whole Aspect of Fuji FC-Series Transmitter", pp. 5 and 6.

*Primary Examiner*—Donald O. Woodiel
*Attorney, Agent, or Firm*—Kenyon & Kenyon

[57] ABSTRACT

A pressure or pressure difference measuring instrument comprising a pot-like housing having an electronic circuit part and a sensor connected to the bottom of the housing through an opening. To be able in such a measuring instrument to arrange the pot-like housing in different positions relative to the sensor while keeping the design simple and easy to assemble and service, the electronic circuit component is designed as a planar subassembly and is inserted into the pot-like housing by means of axis-parallel guides, extending in an axis-parallel plane. Opposite the planar subassembly there is in the wall of the housing another opening to fasten the sensor.

11 Claims, 3 Drawing Figures

PRESSURE OR PRESSURE DIFFERENCE MEASURING INSTRUMENT

BACKGROUND OF THE INVENTION

The present invention relates to a pressure or pressure difference measuring instrument having a pot-like housing in which is accommodated at least one electronic circuit component and in whose bottom there is an opening to fasten a device for measuring the pressure or pressure difference.

In one known measuring instrument of this kind (Fuji Electric Publication EJPW 52-6-1 "Whole Aspect of Fuji FC-Series Transmitter", pages 5 and 6) there is screwed into a pot-like housing an electronic circuit part of cylindrical shape, to which the electrical sensor leads are connected by soldering. To this first electronic circuit part can be plugged a second electronic circuit part of similar shape and firmly connected by screws. An indicating instrument can be plugged to this second electronic circuit part. The pot-like housing is closable by a screw cap. Furthermore, the pot-like housing of the known measuring instrument is provided with a lateral attachment to form a receptacle delimited against the interior of the pot-like housing by a pressure-tight wall with electrical leadthroughs. The pressure-tight wall is formed by a pressure-tight plate which covers as a seal an opening to the interior of the pot-like housing and contains the electrical leadthroughs. Accommodated in this receptacle are external terminals of the measuring instrument.

SUMMARY OF THE INVENTION

It is, therefore, an object of the present invention to provide a pressure or pressure difference measuring instrument which allows the pot-like housing to be arranged in a different position relative to the sensor for measuring the pressure or pressure difference while achieving a pot-like housing design which is simple and easy to assemble and service.

The above and other objects of the present invention are achieved by a pressure or pressure difference measuring instrument having a pot-like housing in which is accommodated at least one electronic circuit component of the pressure or pressure difference measuring instrument. The at least one electronic circuit component is designed as a planar subassembly and inserted into the pot-like housing by means of axis-parallel guides along the inside housing wall, extending in an axis-parallel plane, and the pot-like housing has in its wall, in an area below the planar subassembly, at least one other opening to fasten the sensor. A planar subassembly is understood to mean an electronic circuit unit in which the individual electronic components are mounted on a printed circuit board.

One advantage of the measuring instrument according to the invention is that, due to the use of an axis-parallel planar subassembly disposed in the pot-like housing, areas are formed on the housing wall suited not only to accommodate the additional opening to fasten the sensor, but in which can also be laid the connecting lines to the sensor. Therefore, the measuring instrument according to the invention can be coupled in the axial direction, through its pot-like housing, to the sensor for determining the pressure or pressure difference, but can also be connected to this sensor in the radial direction through the additional opening. Consequently, the existing installation possibilities can be met in an advantageous manner with the measuring instrument according to the invention.

While a pressure gage is known from U.S. Pat. No. 4,085,620 in which a sensor for determining the pressure is connected radially to a potlike housing through an opening in this housing and in which the electronic circuit parts are designed as planar subassemblies, the sensor for determining the pressure can be attached to the pot-like housing radially only in this pressure gage. Additionally, the electronic circuit parts designed as planar subassemblies are mounted transverse to the axis of the pot-like housing in this known pressure gage. An axial attachment of the sensor for determining the pressure is not possible in this known pressure gage, because, in it, a space to accommodate external terminals is provided in the axial direction behind the housing space accommodating the electronic circuit components.

In view of a particularly beneficial utilization of the pot-like housing, considering the requirement that the pot-like housing be attachable to the measuring mechanism in various ways, it is considered advantageous in the measuring instrument according to the present invention if the pressure-tight wall is located above the planar subassembly. This is advantageous for the reason that the leadthroughs, for which adequate space must be made available in the housing, extend in the area of the pressure-tight wall. This space is available in the pot-like housing wall area opposite the planar subassembly.

Especially for production-engineering reasons, it is advantageous to form the pressure-tight wall of the measuring instrument according to the invention solely of a portion of the pot-like housing wall located above the planar subassembly. This obviates the necessity to fasten a pressure plate in sealing fashion in the vicinity of an opening between the receptacle of the pot-like housing and its interior.

It has also turned out to be advantageous if the electrical leadthroughs of the measuring instrument according to the invention are provided with contacts at their ends extending into the housing interior. The planar subassembly therefore has mating contacts which make contact with the former in the inserted state of the planar subassembly. One significant advantage of a measuring instrument according to the invention designed in this manner is that solder connections between the electrical leadthroughs and the planar subassembly can be omitted so that an electric connection between the electrical leadthroughs and the planar subassembly is established automatically, when the planar subassembly is pushed into the pot-like housing.

For production engineering reasons and for particular ease of servicing, it is advantageous, furthermore, to mount to the bottom of the pot-like housing of the measuring instrument according to the invention a contact bank to which are connected wires leading to the sensor. The face of the planar subassembly therefore has a male connector strip to plug into the contact bank. Thus, a measuring instrument constructed in this manner also needs no solder connections between the sensor for determining the pressure or pressure difference and the electronic circuit in the pot-like housing. Merely by pushing the planar subassembly into the pot-like housing is such an electrical connection established.

In an especially preferred embodiment of the pressure or pressure difference measuring instrument according to the invention, the planar subassembly is mounted on a central carrier whose side facing away from the pot-like housing bottom has an approximately circular end face area and contains axis-parallel guide members extending approximately perpendicular thereto, for engagement with the axis parallel guides on the inside wall of the pot-like housing. Such a carrier is of advantage, for instance, whenever not only a single planar subassembly, but two planar subassemblies are to be held in the pot-like housing, as is usually the case in the pressure or pressure difference measuring instrument according to the invention.

Moreover, the central carrier advantageously can be utilized to fasten to its face area an indicating instrument by means of a snap-on connection.

There also may be attached to the face area of the central carrier in an advantageous manner a pivoting yoke, by means of which the central carrier can be pulled out of the pot-like housing.

When a central carrier so designed is used, the entire electronic circuitry of the pressure or pressure difference measuring instrument including the indicating instrument can be inserted into the pot-like housing or removed from the housing with one single manipulation.

Advantageously, the central carrier has, on mutually facing sides of its guide elements, longitudinal slots into which the planar subassembly is inserted. When using several planar subassemblies, an appropriate number of longitudinal slots are provided on top of each other.

It is viewed as advantageous if the planar subassembly has, in its face area facing the central carrier, contact springs which penetrate through holes in the face area and are detachably locked therein. Electrically, the contact springs may be so arranged on the planar subassembly as to lead to test terminals so that the contact springs disposed in the through holes can be subjected to testing without removing the central carrier and the planar subassembly from the pot-like housing.

BRIEF DESCRIPTION OF THE DRAWINGS

The invention will be described in greater detail in the following detailed description with reference to the drawings in which.

DETAILED DESCRIPTION

Figure 1:
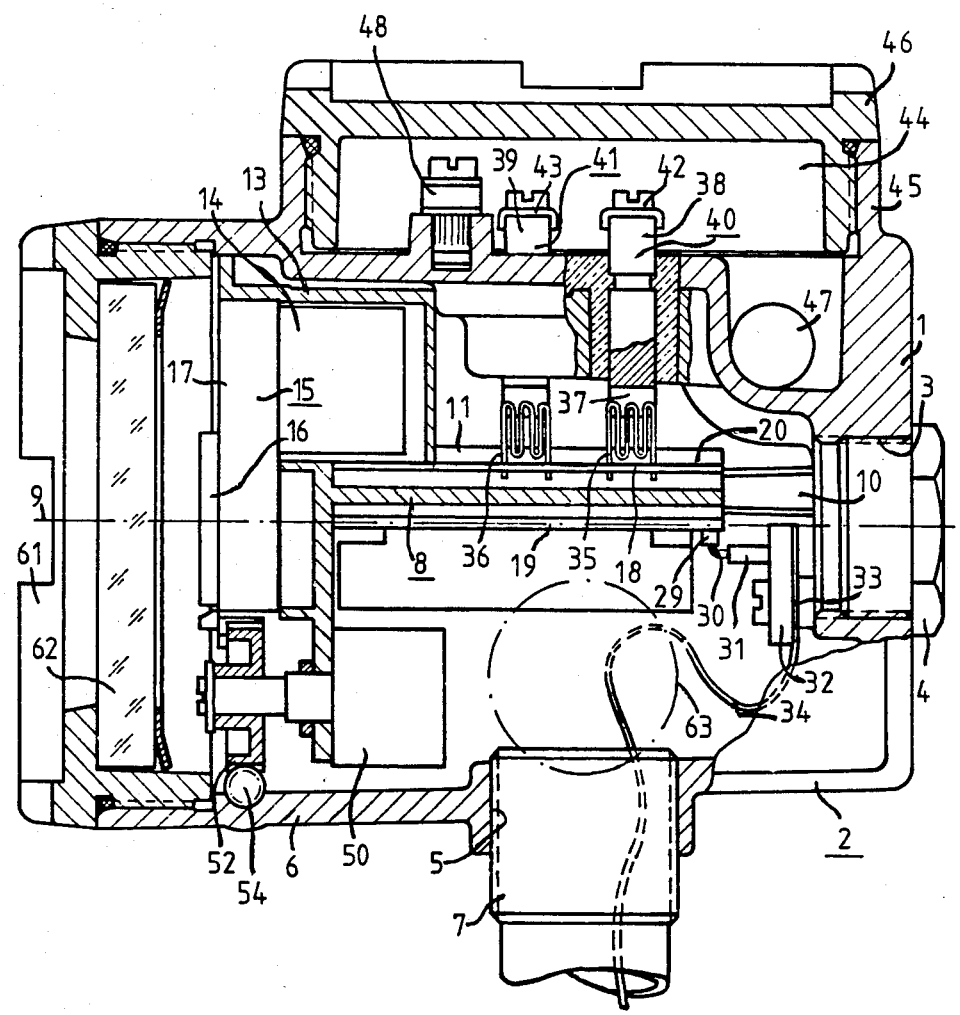
FIG. 1 is essentially a longitudinal side sectional view of the measuring instrument according to the invention.

With reference now to the drawings, as is evident particularly from FIG. 1, there is in one end or the bottom 1 of a pot-like housing 2 of a pressure or pressure difference measuring instrument an opening 3 which can serve to fasten a sensor (measuring mechanism), not shown in the figures, which measures a pressure or pressure difference. In the embodiment shown, the opening 3 is closed by a sealing nut 4. Another opening 5 in a wall 6 of the potlike housing 2 also serves to fasten a sensor for measuring the pressure or pressure difference. In the embodiment shown, a sensor is attached through this additional opening 5 by means of a threaded nipple 7.

Located in the housing 2 is a central carrier 8, inserted in a direction parallel to the longitudinal axis 9 of the pot-like housing 2, mutually opposite guides 10 being provided to guide the central carrier 8 along the inside wall of the pot-like housing 2. These guides 10 are engaged by guide elements 11 and 12 (see FIG. 2) of the carrier 8.

Figure 3:
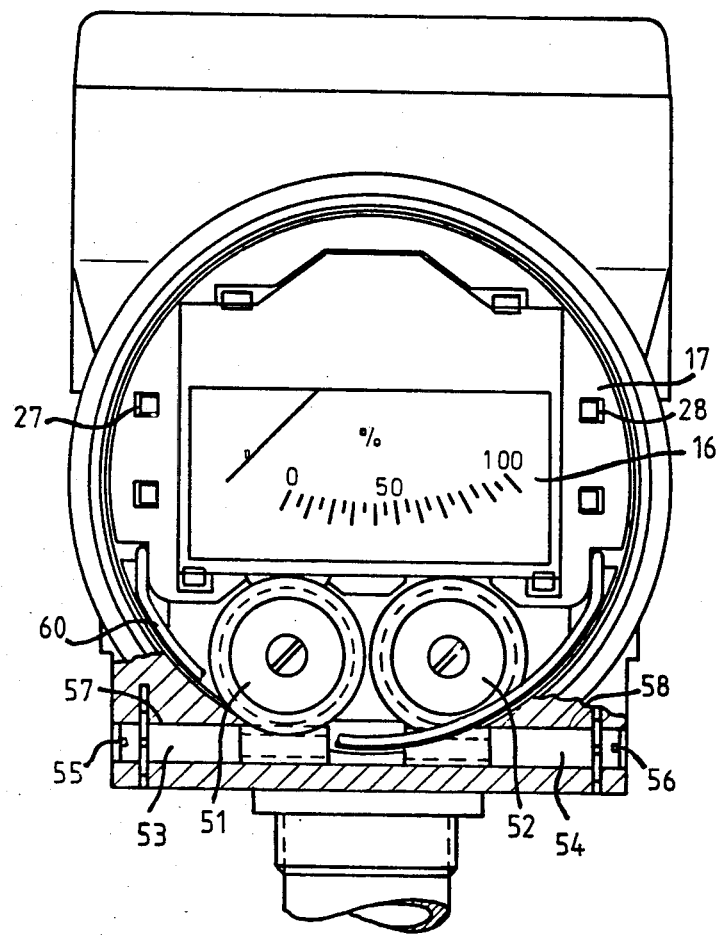
FIG. 3 is a front view with the screw cap removed and partly a sectional view of an embodiment of the pressure or pressure difference measuring instrument according to the present invention.

The central carrier 8 has an attachment 13 which accommodates a measuring mechanism 14 of an indicating instrument 15 whose scale 16 is housed in the approximately circular face area 17 (see FIG. 3) of the central carrier 8.

The central carrier also supports a planar subassembly 18 and another planar subassembly 19. Both planar subassemblies (in their disassembled state) can be inserted from the back in the direction towards the face area 17 of the central carrier 8 in slots 20 in the lateral guide elements 11 and 12, respectively. The planar subassemblies 18 and 19 are locked by contact springs 22 and 23 (see FIG. 2) because after the planar subassemblies are inserted in the direction of arrow 24, the respective free ends 25 of the contact springs 22 and 23 open up, thus gripping behind lugs 26 provided in through holes 27 and 28 in the face area 17 of the central carrier 8 to accommodate the contact springs 22 and 23. The planar subassemblies 18 and 19 can be unlocked simply by introducing plugs or screwdrivers into the through holes 27 and 28 in the direction opposite to arrow 24.

The contact springs 22 and 23 on the planar subassemblies 18 and 19, respectively, are connected, in a manner not shown, to test points so that by attaching a test instrument from the face area 17 of the central carrier 8, a test can be run without removing the central carrier 8. Thus, the contact springs 22 and 23 serve for both connecting a test instrument and locking the planar subassemblies 18 and 19 on the central carrier 8.

As is evident particularly from FIG. 1, there is mounted to the planar subassembly 19 a connector 29 on the side facing away from the face area 17 of the central carrier 8. The connector 29 has a number of pins 30 (see also FIG. 2) which extend in the axis-parallel direction. In the inserted state of the central carrier 8, the pins 30 engage a contact bank 31 located on a support 32. Together with this support 32, one end 33 of a printed circuit band 34 is screwed to the bottom 1 of the pot-like housing 2. The conductor strips on the printed circuit band 34 are electrically connected to the pins 30 via the contact bank 31 in a manner not shown. Through the other opening 5 in the housing 2, the printed circuit band 34 goes to the sensor, not shown, for measuring the pressure or pressure difference, which may be designed as described in the above-mentioned company publication. However, a measuring mechanism is preferred in which an electrical signal is obtained from the measured pressure or pressure difference by means of a semiconductor sensor.

As is further evident from FIG. 1 in particular, the planar subassembly 18 is provided with contacts 35 and 36 extending upwardly in the Figure. In the inserted state of the central carrier 8, these contacts 35 and 36 are in contact with fixed, cemented-in contact elements 37 of contact pieces 38 and 39 of two electrical leadthroughs 40 and 41. These electrical leadthroughs 40 and 41 connect terminals 42 and 43 in a receptacle 44 formed by a lateral extension 45 of the housing 2. This extension 45 is opposite the other opening 5 in the housing and thus above the planar subassemblies 18 and 19, whereas the other opening 5 in FIG. 1 is below these planar subassemblies. The receptacle 44, which can be tightly closed by a screw cap 46, communicates with the outside of the measuring instrument via a through hole 47. Through this through hole 47, the connecting lines, not shown, can be led into the housing 2 and to the terminals 42 and 43. In addition, a grounding terminal 48 is provided in the receptacle 44.

Also mounted to the central carrier 8 are (see FIGS. 1 and 3 in particular) potentiometers 50, respectively equipped with a gear 51 and 52. Each gear 51, 52 meshes with a worm gear 53, 54, respectively, which is movable through an externally accessible slot 55, 56. The worm gears 53 and 54 are disposed in holes 57 and 58 of housing 2 near the rim. The potentiometers can thus be adjusted by actuating the wormgears 53 and 54, one potentiometer serving for the zero adjustment, the other for the range adjustment.

There is also attached to the face area 17 of the central carrier 8 (see FIGS. 2 and 3) a pivoted yoke 60. The yoke 60 can be swung into the plane of the face area 17 of the central carrier 8 and can be flipped forward so that, with its help, the central carrier 8 can be pulled out of the pot-like housing 2. In addition, the yoke 60 is mounted so that, in the inserted state of the carrier 8, a cover 61 pushes against the yoke 60, thereby positively locking the carrier 8 in the housing 2.

Figure 2:
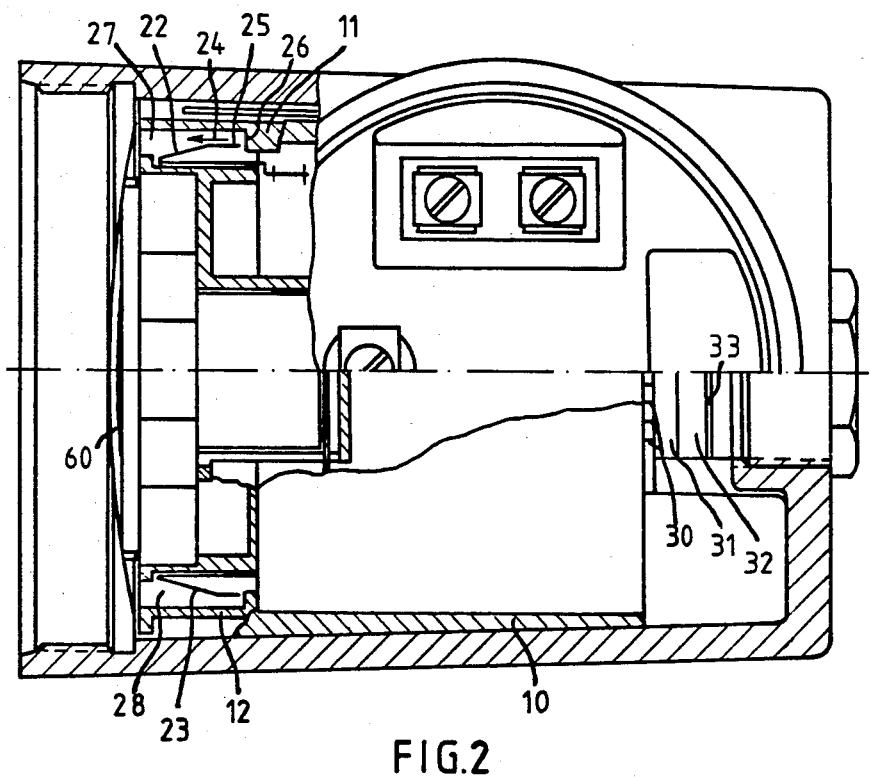
FIG. 2 is a top view partly in cross section.

It may be seen from FIGS. 1 and 2 in particular that the pot-like housing 2 can be closed by a cover 61 provided with a pane 62, through which the indicating instrument can be read.

Another opening 63 in the pot-like housing 2 to accommodate the sensor is indicated, schematically only, in FIG. 1.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A pressure or pressure difference measuring instrument having a pot-like housing in which is accommodated at least one electronic circuit part and having an opening in one end of the pot-like housing for fastening a sensor for the detection of the pressure or pressure difference, the at least one electronic circuit part comprising a planar subassembly and being insertable into the pot-like housing by guide means disposed along the inside wall of the housing, the guide means extending in a plane parallel to the longitudinal axis of the instrument, the pot-like housing having at least one other opening to fasten the sensor in a wall thereof in an area below the planar subassembly.

2. The measuring instrument recited in claim 1 wherein a lateral extension to the pot-like housing forming a receptacle separated from the housing interior by a pressure-tight wall is provided, electrical leadthroughs being provided therethrough, external electrical terminals being provided in the receptacle, the pressure-tight wall being located above the planar subassembly.

3. The measuring instrument recited in claim 2, wherein the pressure-tight wall comprises a wall portion of the pot-like housing located above the planar subassembly.

4. The measuring instrument recited in claim 2, wherein the ends of the electrical leadthroughs projecting into the interior of the housing are provided with contacts, the planar subassembly having mating contacts for engaging the contacts of the leadthroughs when the planar subassembly is inserted into the housing.

5. The measuring instrument recited in claim 1, further comprising a contact bank provided at one end of the pot-like housing, electrical conductor means coupled to pressure sensing means being connected thereto and connector strip means for engaging the contact bank being disposed on the planar subassembly.

6. The measuring instrument recited in claim 1, wherein the planar subassembly is mounted to a central carrier means, the central carrier means having on a side facing away from the end of the pot-like housing, an approximately circular face area, guide elements being disposed parallel to the longitudinal axis and approximately perpendicularly to said face area for engaging the axis-parallel guide means disposed on the inside wall of the pot-like housing.

7. The measuring instrument recited in claim 6, wherein the guide elements of the central carrier have, on mutually facing sides, longitudinal slots into which the planar subassembly is inserted.

8. The measuring instrument recited in claim 6, wherein the planar subassembly includes, on a side facing the face area of the central carrier, contact spring means received in holes in the face area, the contact spring means being detachably locked therein.

9. The measuring instrument recited in claim 6, further comprising pivoting yoke means disposed in the face area of the central carrier for allowing access to the interior of the pot-like housing.

10. The measuring instrument recited in claim 9, wherein the yoke means is spring-mounted so that, in the inserted state of the planar subassembly or of the central carrier, a cover means for closing the housing is biased against the yoke means.

11. The measuring instrument recited in claim 1, further comprising indicating instrument means fastened in the face area of the central carrier by snap-on connection means.

* * * * *